(12) United States Patent
Chen

(10) Patent No.: US 11,567,297 B2
(45) Date of Patent: Jan. 31, 2023

(54) CAMERA OPTICAL LENS

(71) Applicant: AAC Optics Solutions Pte. Ltd., Singapore (SG)

(72) Inventor: Jiekang Chen, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 282 days.

(21) Appl. No.: 16/991,057

(22) Filed: Aug. 12, 2020

(65) Prior Publication Data

US 2021/0048615 A1 Feb. 18, 2021

(30) Foreign Application Priority Data

Aug. 16, 2019 (CN) .......................... 201910760178.9

(51) Int. Cl.
*G02B 9/34* (2006.01)
*G02B 13/00* (2006.01)

(52) U.S. Cl.
CPC ............. *G02B 13/004* (2013.01); *G02B 9/34* (2013.01)

(58) Field of Classification Search
CPC ................................ G02B 13/004; G02B 9/34
See application file for complete search history.

(56) References Cited

FOREIGN PATENT DOCUMENTS

CN 109581623 * 1/2018 ............. G02B 13/00

* cited by examiner

*Primary Examiner* — Joseph P Martinez
(74) *Attorney, Agent, or Firm* — W&G Law Group

(57) ABSTRACT

The present disclosure relates to a camera optical lens satisfying following conditions: $3.00 \leq f2/f \leq 5.00$, $13.00 \leq d5/d6 \leq 25.00$, $3.00 \leq (R5+R6)/(R5-R6) \leq 10.00$, and $5.00 \leq R3/R4 \leq 50.00$; where f denotes an overall focal length of the camera optical lens, f2 denotes a focal length of a second lens, d5 denotes an on-axis thickness of a third lens, d6 denotes an on-axis distance from an image-side surface of the third lens to an object-side surface of a fourth lens, R5 and R6 respectively denote a curvature radius of an object-side surface and the image-side surface of the third lens, and R3 and R4 respectively denote a curvature radius of an object-side surface and an image-side surface of the second lens. The camera optical lens in the present disclosure satisfies a design requirement of large aperture and wide angle while having good optical functions.

10 Claims, 4 Drawing Sheets

CAMERA OPTICAL LENS

TECHNICAL FIELD

The present disclosure relates to the field of optical lens, in particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market.

In order to obtain better imaging quality, the lens that is traditionally equipped in mobile phone cameras adopts a three-piece or four-piece, even five-piece or six-piece lens structure. However, with the development of technology and the increase of the diverse demands of users, and as the pixel area of photosensitive devices is becoming smaller and smaller and the requirement of the system on the imaging quality is improving constantly, although the common four-piece lens has good optical functions, the lens is fairly unreasonable in terms of setting of optical focal degree, lens spacing and lens shape, rendering that the lens structure with good optical functions can not satisfy a design requirement of large aperture, ultra-thinness and wide angle.

SUMMARY

To address the above issues, the present disclosure seeks to provide a camera optical lens that satisfies a design requirement of large aperture, ultra-thinness and wide angle while having good optical functions.

The technical solutions of the present disclosure are as follows:

An camera optical lens comprising, from an object side to an image side: a first lens having a positive refractive power, a second lens having a positive refractive power, a third lens having a positive refractive power, and a fourth lens having a negative refractive power;

wherein the camera optical lens satisfies following conditions:

$3.00 \leq f2/f \leq 50.00$;

$13.00 \leq d5/d6 \leq 25.00$;

$3.00 \leq (R5+R6)/(R5-R6) \leq 10.00$; and $5.00 \leq R3/R4 \leq 50.00$;

where f denotes an overall focal length of the camera optical lens; f2 denotes a focal length of the second lens; d5 denotes an on-axis thickness of the third lens; d6 denotes an on-axis distance from an image-side surface of the third lens to an object-side surface of the fourth lens; R5 denotes a curvature radius of an object-side surface of the third lens; R6 denotes a curvature radius of the image-side surface of the third lens; R3 denotes a curvature radius of an object-side surface of the second lens; and R4 denotes a curvature radius of an image-side surface of the second lens.

As an improvement, the camera optical lens further satisfies the following condition:

$0.50 \leq f3/f \leq 1.00$;

where f3 denotes a focal length of the third lens.

As an improvement, the camera optical lens further satisfies the following condition:

$3.00 \leq (R7+R8)/(R7-R8) \leq 10.00$;

where R7 denotes a curvature radius of the object-side surface of the fourth lens; and R8 denotes a curvature radius of an image-side surface of the fourth lens.

As an improvement, the camera optical lens further satisfies the following condition:

$0.05 \leq d4/f \leq 0.15$;

where d4 denotes an on-axis distance from the image-side surface of the second lens to the object-side surface of the third lens.

As an improvement, the camera optical lens further satisfies the following conditions:

$0.97 \leq f1/f \leq 4.64$;

$-10.66 \leq (R1+R2)/(R1-R2) \leq -1.71$; and $0.05 \leq d1/TTL \leq 0.19$;

where f1 denotes a focal length of the first lens; R1 denotes a curvature radius of an object-side surface of the first lens; R2 denotes a curvature radius of an image-side surface of the first lens; d1 denotes an on-axis thickness of the first lens; and TTL denotes a total optical length from an object-side surface of the first lens to an image surface of the camera optical lens along an optical axis.

As an improvement, the camera optical lens further satisfies the following conditions:

$0.52 \leq (R3+R4)/(R3-R4) \leq 2.20$; and $0.07 \leq d3/TTL \leq 0.21$;

where d3 denotes an on-axis thickness of the second lens; and TTL denotes a total optical length from an object-side surface of the first lens to an image surface of the camera optical lens along an optical axis.

As an improvement, the camera optical lens further satisfies the following condition:

$0.05 \leq d5/TTL \leq 0.25$;

where TTL denotes a total optical length from an object-side surface of the first lens to an image surface of the camera optical lens along an optical axis.

As an improvement, the camera optical lens further satisfies the following conditions:

$-3.77 \leq f4/f \leq -0.88$; and $0.03 \leq d7/TTL \leq 0.14$;

where f4 denotes a focal length of the fourth lens; d7 denotes an on-axis thickness of the fourth lens; and TTL denotes a total optical length from an object-side surface of the first lens to an image surface of the camera optical lens along an optical axis.

As an improvement, the camera optical lens further satisfies the following condition:

$0.72 \leq f12/f \leq 3.09$;

where f12 denotes a combined focal length of the first lens and second lens.

As an improvement, the camera optical lens further satisfies the following condition:

$$FNO \leq 1.34;$$

where FNO denotes an F number of the camera optical lens.

The present disclosure is advantageous in: the camera optical lens in the present disclosure has good optical functions and has characteristics of large aperture and wide angle, and is especially fit for WEB camera lenses and mobile phone camera lens assemblies composed by such camera elements as CCD and CMOS for high pixels.

BRIEF DESCRIPTION OF DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings may also be obtained in accordance with the drawings without any inventive effort.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
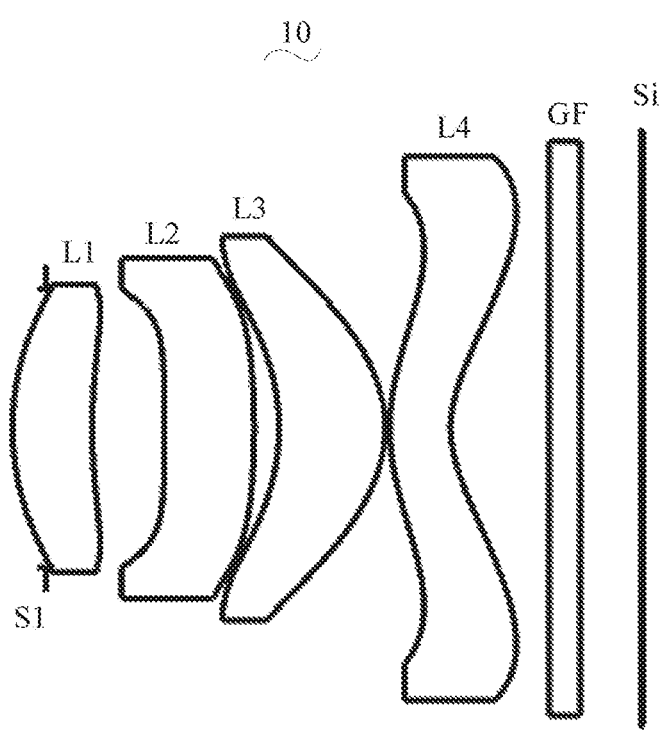
FIG. 1 is a schematic diagram of a structure of a camera optical lens according to Embodiment 1 of the present disclosure.
Figure 2:
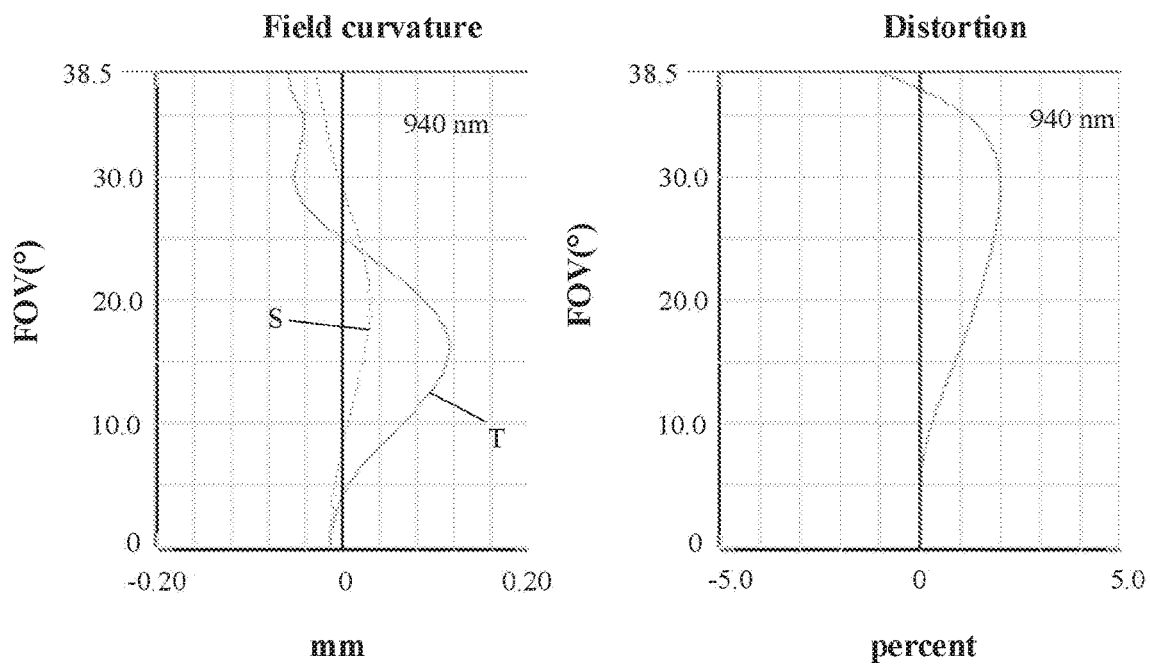
FIG. 2 is a schematic diagram of a field curvature and a distortion of the camera optical lens shown in FIG. 1.

Referring to FIGS. 1 to 2 together, the present disclosure provides a camera optical lens 10. In FIG. 1, the left side is an object side and the right side is an image side. The camera optical lens 10 includes four lenses arranged coaxially, which from the object side to the image side are a first lens L1, a second lens L2, a third lens L3 and a fourth lens L4. An aperture S1 is further provided on an object-side surface of the first lens L1, and an optical element such as an optical filter GF is provided between the fourth lens L4 and an image surface S1.

In this embodiment, the first lens L1 has a positive refractive power, an object-side surface of the first lens L1 is convex and an image-side surface of the first lens L1 is concave; the second lens L2 has a positive refractive power, an object-side surface of the second lens L2 is concave and an image-side surface of the second lens L2 is convex; the third lens L3 has a positive refractive power, an object-side surface of the third lens L3 is concave and an image-side surface of the third lens L3 is convex; the fourth lens L4 has a negative refractive power, an object-side surface of the fourth lens L4 is convex and an image-side surface of the fourth lens L4 is concave.

An overall focal length of the camera optical lens 10 is defined as f; a focal length of the second lens L2 is defined as f2; an on-axis thickness of the third lens L3 is defined as d5; an on-axis distance from the image-side surface of the third lens L3 to the object-side surface of the fourth lens L4 is defined as d6; a curvature radius of the object-side surface of the third lens L3 is defined as R5; a curvature radius of the image-side surface of the third lens L3 is defined as R6; a curvature radius of the object-side surface of the second lens L2 is defined as R3; and a curvature radius of the image-side surface of the second lens L2 is defined as R4. f, f2, d5, d6, R5, R6, R3, R4 satisfy the following conditions:

$$3.00 \leq f2/f \leq 5.00 \tag{1}$$

$$13.00 \leq d5/d6 \leq 25.00 \tag{2}$$

$$3.00 \leq (R5+R6)/(R5-R6) \leq 10.00 \tag{3}$$

$$5.00 \leq R3/R4 \leq 50.00 \tag{4}$$

Herein, condition (1) specifies a ratio between the focal length of the second lens L2 and the focal length of the camera optical lens 10, within a range of which a focal power of the second lens L2 may be effectively allocated to correct the aberration of the optical lens 10, thereby improving the imaging quality.

Condition (2) specifies a ratio between the thickness of the third lens L3 and an air separation distance between the third lens L3 and the fourth lens L4, within a range of which it contributes to lens processing and the assembly of the camera optical lens 10.

Condition (3) specifies a shape of the third lens L3, within a range of which it helps correct the chromatic aberration on the axis.

Condition (4) specifies a shape of the second lens L2, within a range of which the spherical aberration generated by the first lens L1 and the field curvature of the camera optical lens 10 may be effectively balanced.

In this embodiment, a focal length of the third lens L3 is defined as f3, and f3 and f satisfy the following condition:

$$0.50 \leq f3/f \leq 1.00 \tag{5}$$

Condition (5) specifies a ratio between the focal length of the third lens L3 and the focal length of the camera optical lens 10, within a range of which and through a reasonable distribution in focal power, the camera optical lens 10 has better imaging quality and lower sensitivity.

In this embodiment, a curvature radius of the object-side surface of the fourth lens L4 is defined as R7, a curvature radius of the image-side surface of the fourth lens L4 is defined as R8, and R7 and R8 satisfy the following condition:

$$3.00 \leq (R7+R8)/(R7-R8) \leq 10.00 \tag{6}$$

Condition (6) specifies a shape of the fourth lens L4, within a range of which it helps correct such a problem as an off-axis aberration while facilitating the development of the camera optical lens 10 towards ultra-thinness and wide angle.

In this embodiment, an on-axis distance from the image-side surface of the second lens L2 to the object-side surface of the third lens L3 is defined as d4, and d4 and f satisfy the following condition:

$$0.05 \leq d4/f \leq 0.15 \tag{7}$$

Condition (7) specifies a ratio between the on-axis distance from the image-side surface of the second lens L2 to the object-side surface of the third lens L3 and the focal length of the camera optical lens 10, within a range of which it helps compress a total optical length from the object-side surface of the first lens L1 to an image surface S1 of the camera optical lens 10 along an optical axis, thereby an ultra-thinness effect is realized.

In this embodiment, a focal length of the first lens L1 is defined as f1, a curvature radius of the object-side surface of the first lens is defined as R1, a curvature radius of the image-side surface of the first lens is defined as R2, and an on-axial thickness of the first lens L1 is defined as d1, and a total optical length from the object-side surface of the first lens L1 to the image surface of the camera optical lens 10 along the optical axis is defined as TTL. f1, f, R1, R2, d1 and TTL satisfy the following conditions:

$$0.97 \leq f1/f \leq 4.64 \tag{8}$$

$$-10.66 \leq (R1+R2)/(R1-R2) \leq -1.71 \tag{9}$$

$$0.05 \leq d1/TTL \leq 0.19 \tag{10}$$

Herein, condition (8) specifies an ratio between the focal length of the first lens L1 and the focal length of the camera optical lens 10, within a range of which, the first lens L1 has an appropriate positive refractive power, which helps reduce the aberration of the camera optical lens 10 while facilitating its development towards ultra-thinness and wide-angle.

Condition (9) specifies a shape of the first lens L1, within a range of which, the shape of the first lens L1 is reasonably controlled so that the first lens L1 may effectively correct the spherical aberration of the camera optical lens 10.

Condition (10) specifies a ratio between the on-axial thickness of the first lens L1 and the total optical length from the object-side surface of the first lens L1 to the image surface S1 of the camera optical lens 10 along the optical axis, within a range of which it helps realize ultra-thin effect.

In this embodiment, an on-axis thickness of the second lens L2 is defined as d3, and R3, R4, d3, and TTL satisfy the following conditions:

$$0.52 \leq (R3+R4)/(R3-R4) \leq 2.20 \tag{11}$$

$$0.07 \leq d3/TTL \leq 0.21 \tag{12}$$

Herein, condition (11) specifies a shape of the second lens L2, within a range of which it helps correct an on-axis aberration with the camera optical lens 10' development towards ultra-thinness and wide-angle.

Condition (12) specifies a ratio between the on-axial thickness of the second lens L2 and the total optical length from the object-side surface of the first lens L1 to the image surface S1 of the camera optical lens 10 along the optical axis, within a range of which it helps realize ultra-thin effect.

In this embodiment, d5 and TTL satisfy the following condition:

$$0.05 \leq d5/TTL \leq 0.25 \tag{13}$$

Condition (13) specifies a ratio between an on-axial thickness of the third lens L3 and the total optical length from the object-side surface of the first lens L1 to the image surface S1 of the camera optical lens 10 along the optical axis, within a range of which it helps realize ultra-thin effect.

In this embodiment, a focal length of the fourth lens L4 is defined as f4, an on-axial thickness of the fourth lens L4 is defined as d7, and f4, f, d7, and TTL satisfy the following conditions:

$$-3\ 0.77 \leq f4/f \leq -0.88 \tag{14}$$

$$0.03 \leq d7/TTL \leq 0.14 \tag{15}$$

Herein, condition (14) specifies a ratio between the focal length of the fourth lens L4 and the total focal length of the camera optical lens 10, within a range of which and through a reasonable distribution in focal power, the camera optical lens 10 has better imaging quality and lower sensitivity while helping improve the performance of the camera optical lens 10.

Condition (15) specifies a ratio between the on-axial thickness of the fourth lens L4 and the total optical length from the object-side surface of the first lens L1 to the image surface Si of the camera optical lens 10 along the optical axis, within a range of which it helps realize ultra-thin effect.

In this embodiment: a frequency bandwidth of the camera optical lens 10 is 920 nm-960 nm and the camera optical lens 10 satisfies the following conditions: $0.72 \leq f12/f \leq 3.09$, $FNO \leq 1.34$, where a combined focal length of the first lens L1 and the second lens L2 of the camera optical lens 10 is defined as f12 and an F number of the camera optical lens 10 is defined as FNO. Within the range of condition f12/f, the aberration and distortion of the camera optical lens 10 may be eliminated, and the back focal length of the camera optical lens 10 may be suppressed to maintain the miniaturization of the imaging lens system group.

When the focal length of the camera optical lens 10, focal lengths and curvature radiuses of each lens satisfy the above conditions, the camera optical lens 10 may have good optical functions and may satisfy the design requirement of large aperture, wide angle, and the preferably frequency band width of 920 nm-960 nm. According to the characteristics of the camera optical lens 10, the camera optical lens 10 is especially fit for WEB camera lenses and mobile phone camera lens assemblies composed by such camera elements as CCD and CMOS for high pixels.

In addition, the camera optical lens 10 of the present disclosure is a TOF (Time of flight) receiving end lens. The principle of the TOF technology is that a transmitting end lens emits an infrared light source which irradiates an object and then reflects back, and the receiving end lens receives the reflected infrared light information. The process implements the 3D recognition process. The working wavelength range of the camera optical lens 10 of the present disclosure is 920 nm-960 nm.

In the following, embodiments will be used to describe the camera optical lens 10 of the present disclosure. The symbols recorded in each embodiment will be described as follows. The focal length, on-axis distance, curvature radius, on-axis thickness, TTL, inflexion point position, and arrest point position are all in units of mm.

In addition, inflexion points and/or arrest points may be arranged on the object-side surface and/or the image-side surface of the lens, so as to satisfy the demand for high quality imaging. The description below may be referred for specific implementations.

The design data of the camera optical lens 10 shown in FIG. 1 is shown below.

Table 1 lists object-side surface and image-side surface curvature radiuses R, on-axis thicknesses of each lens, distance d between two adjacent lenses, refraction indexes nd and abbe numbers vd of the first to fourth lenses L1 to L4 that forms the camera optical lens 10 in Embodiment 1 of the present disclosure.

TABLE 1

|  | R | d |  | nd |  | vd |
| --- | --- | --- | --- | --- | --- | --- |
| S1 | ∞ | d0= | −0.220 |  |  |  |
| R1 | 1.846 | d1= | 0.530 | nd1 | 1.6400 | v1 | 23.54 |
| R2 | 4.207 | d2= | 0.480 |  |  |  |
| R3 | −184.463 | d3= | 0.594 | nd2 | 1.6610 | v2 | 20.53 |
| R4 | −6.144 | d4= | 0.166 |  |  |  |
| R5 | −1.437 | d5= | 0.708 | nd3 | 1.6610 | v3 | 20.53 |
| R6 | −0.842 | d6= | 0.030 |  |  |  |
| R7 | 1.360 | d7= | 0.404 | nd4 | 1.6610 | v4 | 20.53 |
| R8 | 0.730 | d8= | 0.654 |  |  |  |
| R9 | ∞ | d9= | 0.210 | ndg | 1.5168 | vg | 64.17 |
| R10 | ∞ | d10= | 0.418 |  |  |  |

In the table, meanings of various symbols will be described as follows.

S1: aperture;
R: curvature radius of an optical surface, a central curvature radius for a lens;
R1: curvature radius of the object-side surface of the first lens L1;
R2: curvature radius of the image-side surface of the first lens L1;
R3: curvature radius of the object-side surface of the second lens L2;
R4: curvature radius of the image-side surface of the second lens L2;
R5: curvature radius of the object-side surface of the third lens L3;
R6: curvature radius of the image-side surface of the third lens L3;
R7: curvature radius of the object-side surface of the fourth lens L4;
R8: curvature radius of the image-side surface of the fourth lens L4;
R9: curvature radius of the object-side surface of the optical filter GF;
R10: curvature radius of the image-side surface of the optical filter GF;
d: on-axis thickness of a lens, an on-axis distance between lens;
d0: on-axis distance from the aperture S1 to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the optical filter GF;
d9: on-axis thickness of the optical filter GF;
d10: on-axis distance from the image-side surface to the image surface S1 of the optical filter GF;
nd: refractive index of the d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
ndg: refractive index of the d line of the optical filter GF;
vd: abbe number;
v1: abbe number of the first lens L1;
v2: abbe number of the second lens L2;
v3: abbe number of the third lens L3;
v4: abbe number of the fourth lens L4;
vg: abbe number of the optical filter GF.

Table 2 shows aspherical surface data of the camera optical lens 10 in Embodiment 1 of the present disclosure.

TABLE 2

|  | Conic coefficient | Aspheric surface coefficients | | | | | | |
| --- | --- | --- | --- | --- | --- | --- | --- | --- |
|  | k | A4 | A6 | A8 | A10 | A12 | A14 | A16 |
| R1 | −3.2199E−01 | 5.7215E−02 | −2.5616E−01 | 7.3977E−01 | −1.2397E+00 | 1.0875E+00 | −4.1930E−01 | 9.7986E−03 |
| R2 | −3.8757E+01 | 6.1812E−02 | −1.6478E−01 | 2.0426E−01 | −2.7891E−01 | 9.6335E−02 | 4.4544E−03 | −7.6564E−03 |
| R3 | −1.6995E+02 | −3.5068E−01 | 1.7512E+00 | −8.2969E+00 | 2.0241E+01 | −2.7917E+01 | 1.9298E+01 | −5.0490E+00 |
| R4 | −3.3548E−01 | −6.8458E−02 | −1.4501E−01 | 4.9213E−01 | −8.4193E−01 | 6.1210E−01 | −1.5366E−01 | 9.8204E−04 |
| R5 | −1.7813E+00 | 3.0827E−02 | −3.1782E−01 | 1.0235E+00 | −1.6728E+00 | 1.5025E+00 | −6.7020E−01 | 1.1515E−01 |
| R6 | −1.8210E+00 | 6.9246E−02 | −2.4285E−01 | 2.7434E−01 | −2.2694E−01 | 1.4934E−01 | −5.6610E−02 | 8.5502E−03 |
| R7 | −9.3903E+00 | 5.9467E−02 | −1.2338E−01 | 7.1533E−02 | −2.4873E−02 | 4.6434E−03 | −3.8988E−04 | 9.6020E−07 |
| R8 | −4.7112E+00 | 2.6470E−03 | −4.3671E−02 | 2.4009E−02 | −7.4033E−03 | 1.1445E−03 | −8.3549E−05 | 1.6513E−06 |

Herein, k is a conic coefficient, and A4, A6, A8, A10, A12, A14 and A16 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}$$

For convenience, an aspheric surface of each lens surface uses the aspheric surfaces shown in the above formula. However, the present disclosure is not limited to the aspherical polynomials form shown in the formula.

TABLE 3

|  | Number(s) of inflexion points | Inflexion point position 1 | Inflexion point position 2 |
| --- | --- | --- | --- |
| P1R1 | 1 | 0.855 |  |
| P1R2 | 1 | 0.565 |  |
| P2R1 | 1 | 0.915 |  |
| P2R2 | 1 | 1.035 |  |
| P3R1 | 2 | 0.865 | 1.185 |
| P3R2 | 1 | 1.095 |  |

TABLE 3-continued

| | Number(s) of inflexion points | Inflexion point position 1 | Inflexion point position 2 |
|---|---|---|---|
| P4R1 | 1 | 0.675 | |
| P4R2 | 1 | 0.685 | |

TABLE 4

| | Number(s) of arrest points | Arrest point position 1 |
|---|---|---|
| P1R1 | | |
| P1R2 | 1 | 0.795 |
| P2R1 | | |
| P2R2 | | |
| P3R1 | | |
| P3R2 | | |
| P4R1 | 1 | 1.215 |
| P4R2 | 1 | 1.465 |

Table 3 and Table 4 show design data of inflexion points and arrest points of the camera optical lens 10 in this embodiment. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, respectively. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

In addition, the following Table 13 further lists the values corresponding to various parameters and conditions in Embodiment 1.

FIG. 2 illustrates a field curvature and a distortion of light with a wavelength of 940 nm after passing the camera optical lens 10. A field curvature S in FIG. 2 is a field curvature in a sagittal direction, and T is a field curvature in a tangential direction.

In this embodiment, an image height of the camera optical lens 10 is IH, a field of view is FOV, and an entrance pupil diameter is ENPD, where IH=2.00 mm, the FOV=77.00° in a diagonal direction, and ENPD=1.894. Thus, the camera optical lens 10 has a large aperture and is ultra-thin and wide-angled, thereby achieving an excellent imaging performance.

Embodiment 2

Figure 3:
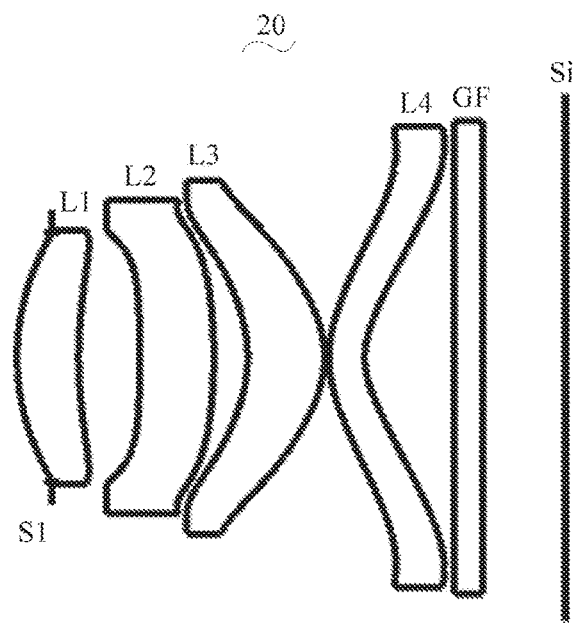
FIG. 3 is a schematic diagram of a structure of a camera optical lens according to Embodiment 2 of the present disclosure.

FIG. 3 is a schematic diagram of a structure of a camera optical lens 20 in Embodiment 2. Embodiment 2 is basically the same as Embodiment 1 and involves symbols in the following tables having the same meanings as Embodiment 1, so the same parts are not repeated here, and only the differences therebetween will be described in the following.

Table 5 and Table 6 show design data of a camera optical lens 20 in Embodiment 2 of the present disclosure.

TABLE 5

| | R | d | | nd | | vd | |
|---|---|---|---|---|---|---|---|
| S1 | ∞ | d0= | −0.253 | | | | |
| R1 | 1.714 | d1= | 0.452 | nd1 | 1.6400 | v1 | 23.54 |
| R2 | 2.908 | d2= | 0.447 | | | | |
| R3 | −21.224 | d3= | 0.544 | nd2 | 1.6610 | v2 | 20.53 |
| R4 | −4.005 | d4= | 0.249 | | | | |
| R5 | −0.989 | d5= | 0.573 | nd3 | 1.6610 | v3 | 20.53 |
| R6 | −0.739 | d6= | 0.030 | | | | |
| R7 | 0.771 | d7= | 0.263 | nd4 | 1.6610 | v4 | 20.53 |
| R8 | 0.530 | d8= | 0.654 | | | | |
| R9 | ∞ | d9= | 0.210 | ndg | 1.5168 | vg | 64.17 |
| R10 | ∞ | d10= | 0.611 | | | | |

TABLE 6

| | Conic coefficient | Aspheric surface coefficients | | | | | | |
|---|---|---|---|---|---|---|---|---|
| | k | A4 | A6 | A8 | A10 | A12 | A14 | A16 |
| R1 | −6.2794E−01 | 1.4778E−02 | −1.1482E−01 | 4.8451E−01 | −9.5306E−01 | 9.6086E−01 | −4.1368E−01 | 1.1561E−03 |
| R2 | −8.5364E+01 | 1.4922E−01 | −2.9400E−01 | 4.0410E−01 | −4.1244E−01 | 8.9440E−02 | 8.0159E−03 | 2.7814E−03 |
| R3 | −2.9763E+01 | −2.9498E−01 | 1.5965E+00 | −8.0132E+00 | 2.0132E+01 | −2.7928E+01 | 1.9295E+01 | −5.0497E+00 |
| R4 | 2.6491E+00 | −2.7012E−02 | −1.8961E−01 | 4.7958E−01 | −8.1755E−01 | 5.9827E−01 | −1.5205E−01 | 1.3051E−02 |
| R5 | −5.7508E+00 | −1.1344E−01 | −3.1838E−01 | 1.0488E+00 | −1.6678E+00 | 1.5066E+00 | −6.6948E−01 | 1.1369E−01 |
| R6 | −2.4330E+00 | 2.2670E−02 | −2.4218E−01 | 2.8389E−01 | −2.2194E−01 | 1.4882E−01 | −5.8705E−02 | 9.1759E−03 |
| R7 | −6.5632E+00 | 1.4497E−01 | −1.7948E−01 | 9.8991E−02 | −3.0925E−02 | 4.5033E−03 | −9.6832E−05 | −2.7630E−05 |
| R8 | −4.5044E+00 | 5.0095E−02 | −6.9994E−02 | 3.2245E−02 | −8.1848E−03 | 8.2287E−04 | 5.3950E−06 | −2.8767E−06 |

Table 7 and table 8 show design data of inflexion points and arrest points of each lens of the camera optical lens 20 lens.

TABLE 7

| | Number(s) of inflexion points | Inflexion point position 1 |
|---|---|---|
| P1R1 | 1 | 0.865 |
| P1R2 | 1 | 0.625 |
| P2R1 | 1 | 0.915 |
| P2R2 | 1 | 0.975 |
| P3R1 | 1 | 0.875 |
| P3R2 | 1 | 1.025 |
| P4R1 | 1 | 0.825 |
| P4R2 | 1 | 0.765 |

TABLE 8

| | Number of arrest points | Arrest point position 1 |
|---|---|---|
| P1R1 | | |
| P1R2 | 1 | 0.835 |
| P2R1 | | |
| P2R2 | 1 | 1.105 |
| P3R1 | 1 | 1.165 |
| P3R2 | | |
| P4R1 | 1 | 1.535 |
| P4R2 | 1 | 1.575 |

In addition, the following Table 13 further lists the values corresponding to various parameters and conditions in Embodiment 2.

Figure 4:
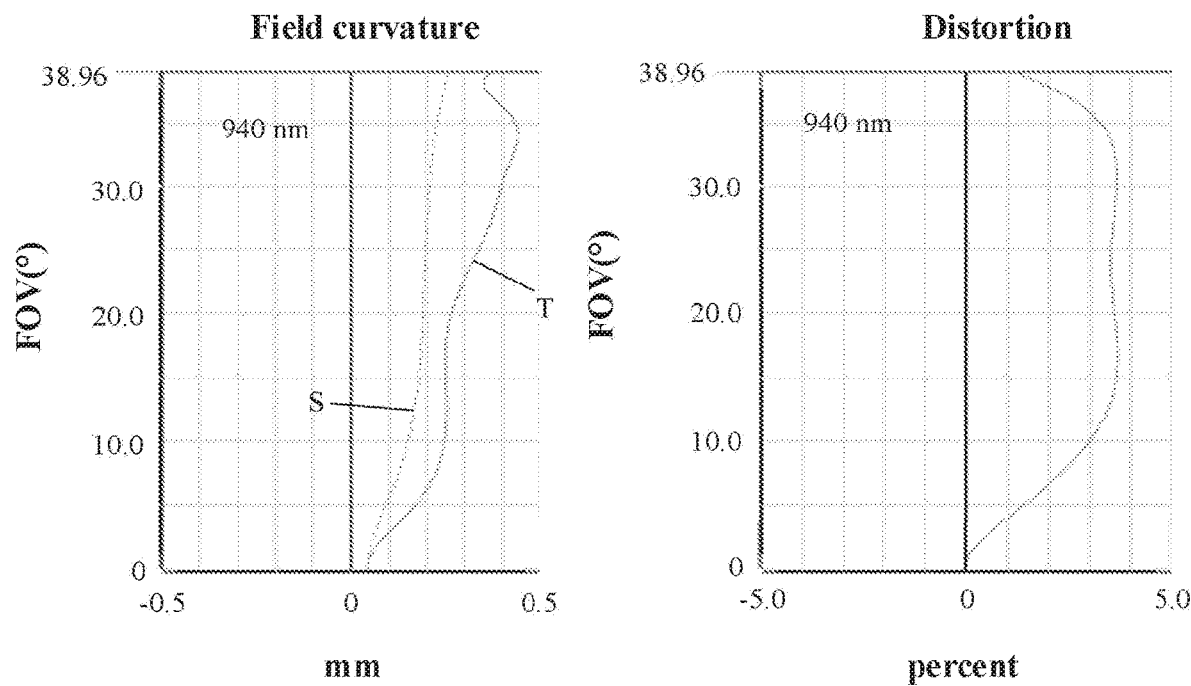
FIG. 4 is a schematic diagram of a field curvature and a distortion of the camera optical lens shown in FIG. 3.

FIG. 4 illustrates a field curvature and a distortion of light with a wavelength of 546 nm after passing the camera optical lens 20. A field curvature S in FIG. 4 is a field curvature in a sagittal direction, and T is a field curvature in a tangential direction.

In this embodiment, an image height of the camera optical lens 20 is IH, a field of view is FOV, and an entrance pupil diameter is ENPD, where IH=2.00 mm, the FOV=77.92° in a diagonal direction, and ENPD=1.851. Thus, the camera optical lens 20 has a large aperture and is ultra-thin and wide-angled, thereby achieving an excellent imaging performance.

Embodiment 3

Figure 5:
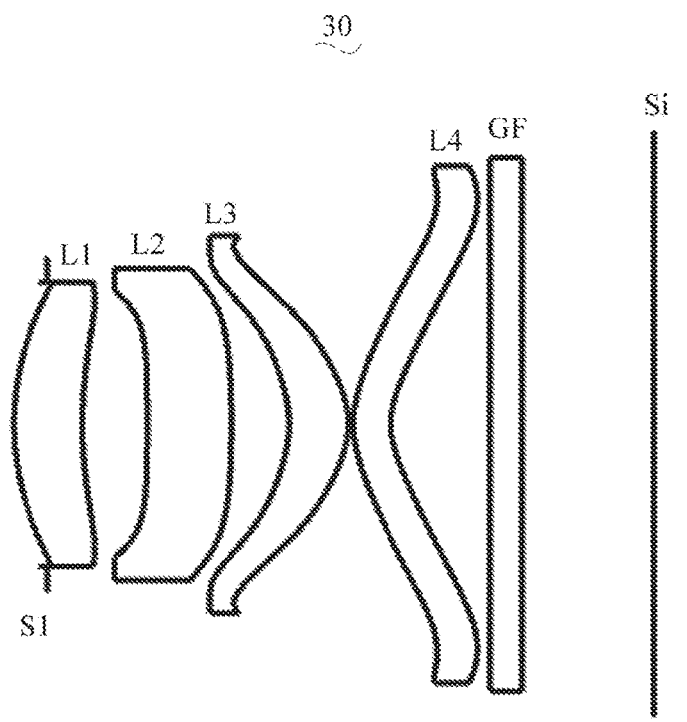
FIG. 5 is a schematic diagram of a structure of a camera optical lens according to Embodiment 3 of the present disclosure.

FIG. 5 is a schematic diagram of a structure of a camera optical lens 30 in Embodiment 3. Embodiment 3 is basically the same as Embodiment 1 and involves symbols in the following tables having the same meanings as Embodiment 1, so the same parts are not repeated here, and only the differences therebetween will be described in the following.

Table 9 and Table 10 show design data of a camera optical lens 30 in Embodiment 3 of the present disclosure.

TABLE 9

| | R | d | | nd | | vd |
|---|---|---|---|---|---|---|
| S1 | ∞ | d0= | −0.220 | | | |
| R1 | 1.859 | d1= | 0.449 | nd1 | 1.6400 | v1 23.54 |
| R2 | 2.718 | d2= | 0.424 | | | |
| R3 | −398.195 | d3= | 0.551 | nd2 | 1.6610 | v2 20.53 |
| R4 | −7.972 | d4= | 0.379 | | | |
| R5 | −0.663 | d5= | 0.392 | nd3 | 1.6610 | v3 20.53 |
| R6 | −0.542 | d6= | 0.030 | | | |
| R7 | 0.689 | d7= | 0.250 | nd4 | 1.6610 | v4 20.53 |
| R8 | 0.469 | d8= | 0.654 | | | |
| R9 | ∞ | d9= | 0.210 | ndg | 1.5168 | vg 64.17 |
| R10 | ∞ | d10= | 0.861 | | | |

Table 11 and Table 12 show design data of inflexion points and arrest points of the respective lenses in the camera optical lens 30.

TABLE 11

| | Number(s) of inflexion points | Inflexion point position 1 | Inflexion point position 2 |
|---|---|---|---|
| P1R1 | 1 | 0.885 | |
| P1R2 | 1 | 0.615 | |
| P2R1 | | | |
| P2R2 | 1 | 1.005 | |
| P3R1 | 1 | 0.885 | |
| P3R2 | 1 | 0.945 | |
| P4R1 | 2 | 1.025 | 1.705 |
| P4R2 | 1 | 0.915 | |

TABLE 12

| | Number of arrest points | Arrest point position 1 |
|---|---|---|
| P1R1 | | |
| P1R2 | 1 | 0.845 |
| P2R1 | | |
| P2R2 | | |
| P3R1 | 1 | 1.135 |
| P3R2 | 1 | 1.215 |
| P4R1 | 1 | 1.535 |
| P4R2 | 1 | 1.525 |

In addition, the following Table 13 further lists the values corresponding to various parameters and conditions in Embodiment 3.

Figure 6:
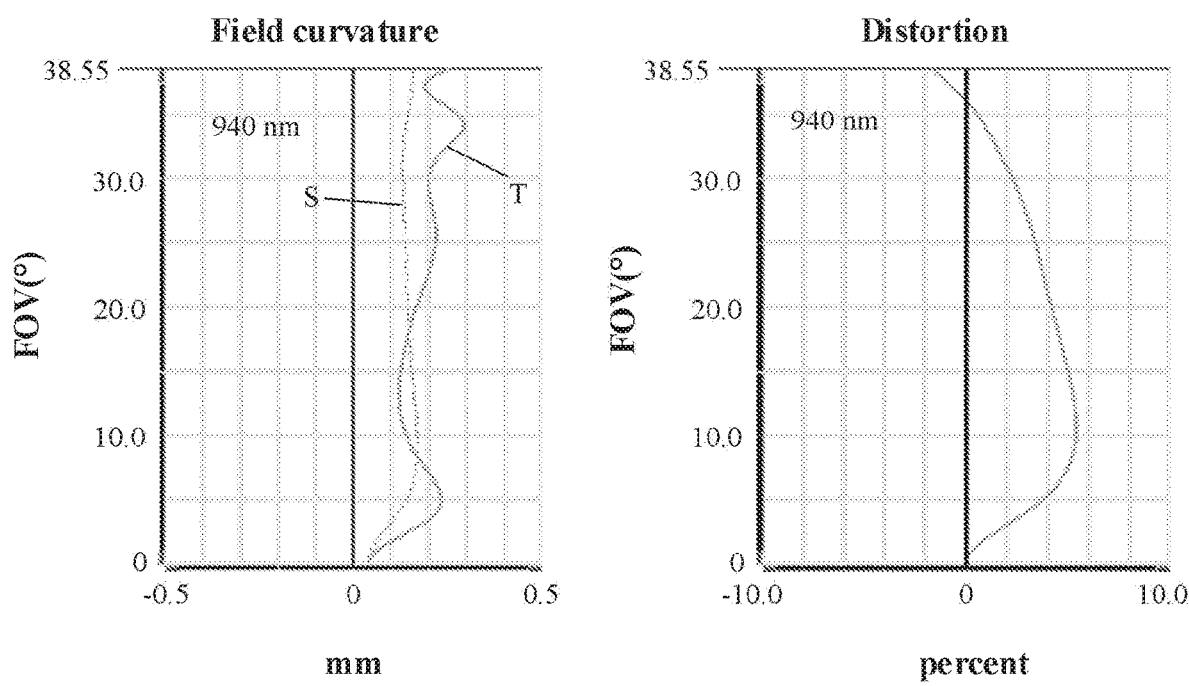
FIG. 6 is a schematic diagram of a field curvature and a distortion of the camera optical lens shown in FIG. 5.

FIG. 6 illustrates a field curvature and a distortion of light with a wavelength of 940 nm after passing the camera optical lens 30. A field curvature S in FIG. 6 is a field curvature in a sagittal direction, and T is a field curvature in a tangential direction.

In this embodiment, an image height of the camera optical lens 30 is IH, a field of view is FOV, and an entrance pupil diameter is ENPD, where IH=2.00 mm, the FOV=77.10° in a diagonal direction, and ENPD=1.927. Thus, the camera

TABLE 10

| | Conic coefficient | Aspherical surface coefficients | | | | | | |
|---|---|---|---|---|---|---|---|---|
| | k | A4 | A6 | A8 | A10 | A12 | A14 | A16 |
| R1 | 1.6841E+00 | −1.7327E−02 | −2.0846E−01 | 6.5380E−01 | −1.2256E+00 | 1.1207E+00 | −4.3282E−01 | 6.7326E−03 |
| R2 | −5.6846E+01 | 1.4924E−01 | −3.0713E−01 | 3.7171E−01 | −3.6046E−01 | 1.1788E−01 | −1.1808E−02 | −7.5067E−03 |
| R3 | 2.0000E+02 | −3.1331E−01 | 1.5359E+00 | −7.8943E+00 | 2.0033E+01 | −2.7942E+01 | 1.9316E+01 | −5.0324E+00 |
| R4 | 1.2634E+01 | −5.2099E−02 | −2.9083E−01 | 5.7243E−01 | −7.8250E−01 | 5.4115E−01 | −1.9776E−01 | 5.2165E−02 |
| R5 | −1.1609E+01 | −3.4164E−01 | −1.7530E−01 | 1.0160E+00 | −1.7005E+00 | 1.5171E+00 | −6.2203E−01 | 8.9596E−02 |
| R6 | −4.5108E+00 | −2.5942E−01 | −1.1764E−01 | 2.8460E−01 | −2.0758E−01 | 1.6080E−01 | −8.9391E−02 | 2.2450E−02 |
| R7 | −6.3001E+00 | 1.0091E−01 | −1.1830E−01 | 8.5552E−02 | −3.5383E−02 | 5.1909E−03 | 3.3529E−04 | −1.0174E−04 |
| R8 | −5.4320E+00 | 3.5528E−02 | −3.4361E−02 | 2.0622E−02 | −9.1597E−03 | 8.4207E−04 | 3.0152E−04 | −4.7639E−05 | optical lens 30 has a large aperture and is ultra-thin and wide-angled, thereby achieving an excellent imaging performance.

The following table 13 lists the values of the corresponding parameters in Embodiment 1, Embodiment 2, and Embodiment 3 and conditions (1), (2), (3), (4) and (5) according to the above conditions.

TABLE 13

| Parameters and conditions | Embodiment 1 | Embodiment 2 | Embodiment 3 | Remarks |
|---|---|---|---|---|
| f2/f | 3.97 | 3.12 | 5.00 | Condition (1) |
| d5/d6 | 23.60 | 19.10 | 13.07 | Condition (2) |
| (R5 + R6)/(R5 − R6) | 3.83 | 6.91 | 9.96 | Condition (3) |
| R3/R4 | 30.02 | 5.30 | 49.95 | Condition (4) |
| f | 2.519 | 2.462 | 2.563 | |
| f1 | 4.906 | 5.909 | 7.934 | |
| f2 | 9.996 | 7.681 | 12.804 | |
| f3 | 2.189 | 2.437 | 2.074 | |
| f4 | −3.308 | −4.639 | −4.141 | |
| FNO | 1.330 | 1.330 | 1.330 | |

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. A camera optical lens comprising of four lenses, from an object side to an image side:
   a first lens having a positive refractive power;
   a second lens having a positive refractive power;
   a third lens having a positive refractive power; and
   a fourth lens having a negative refractive power;
   wherein the camera optical lens satisfies following conditions:

$3.00 \leq f2/f \leq 3.97;$ $13.00 \leq d5/d6 \leq 25.00;$ $3.00 \leq (R5+R6)/(R5-R6) \leq 10.00;$ $5.00 \leq R3/R4 \leq 50.00;$ where
   f denotes an overall focal length of the camera optical lens;
   f2 denotes a focal length of the second lens;
   d5 denotes an on-axis thickness of the third lens;
   d6 denotes an on-axis distance from an image-side surface of the third lens to an object-side surface of the fourth lens;
   R5 denotes a curvature radius of an object-side surface of the third lens;
   R6 denotes a curvature radius of the image-side surface of the third lens;
   R3 denotes a curvature radius of an object-side surface of the second lens; and
   R4 denotes a curvature radius of an image-side surface of the second lens.

2. The camera optical lens according to claim 1 further satisfying following condition:

$0.50 \leq f3/f \leq 1.00;$ where
   f3 denotes a focal length of the third lens.

3. The camera optical lens according to claim 1 further satisfying the following condition:

$3.00 \leq (R7+R8)/(R7-R8) \leq 10.00;$ where
   R7 denotes a curvature radius of the object-side surface of the fourth lens; and
   R8 denotes a curvature radius of an image-side surface of the fourth lens.

4. The camera optical lens according to claim 1 further satisfying the following condition:

$0.05 \leq d4/f \leq 0.15;$ where
   d4 denotes an on-axis distance from the image-side surface of the second lens to the object-side surface of the third lens.

5. The camera optical lens according to claim 1 further satisfying the following conditions:

$0.97 \leq f1/f \leq 4.64;$ $-10.66 \leq (R1+R2)/(R1-R2) \leq -1.71;$ and $0.05 \leq d1/TTL \leq 0.19;$ where
   f1 denotes a focal length of the first lens;
   R1 denotes a curvature radius of an object-side surface of the first lens;
   R2 denotes a curvature radius of an image-side surface of the first lens;
   d1 denotes an on-axis thickness of the first lens; and
   TTL denotes a total optical length from an object-side surface of the first lens to an image surface of the camera optical lens along an optical axis.

6. The camera optical lens according to claim 1 further satisfying the following conditions:

$0.52 \leq (R3+R4)/(R3-R4) \leq 2.20;$ and $0.07 \leq d3/TTL \leq 0.21;$ where
   d3 denotes an on-axis thickness of the second lens; and
   TTL denotes a total optical length from an object-side surface of the first lens to an image surface of the camera optical lens along an optical axis.

7. The camera optical lens according to claim 1 further satisfying the following condition:

$0.05 \leq d5/TTL \leq 0.25;$ where

TTL denotes a total optical length from an object-side surface of the first lens to an image surface of the camera optical lens along an optical axis.

8. The camera optical lens according to claim 1 further satisfying the following conditions:

$-3.77 \leq f4/f \leq -0.88$; and $0.03 \leq d7/TTL \leq 0.14$;

where f4 denotes a focal length of the fourth lens;

d7 denotes an on-axis thickness of the fourth lens; and

TTL denotes a total optical length from an object-side surface of the first lens to an image surface of the camera optical lens along an optical axis.

9. The camera optical lens according to claim 1 further satisfying the following condition:

$0.72 \leq f12/f \leq 3.09$;

where f12 denotes a combined focal length of the first lens and second lens.

10. The camera optical lens according to claim 1 further satisfying the following condition:

$FNO \leq 1.34$;

where

FNO denotes an F number of the camera optical lens.

* * * * *